W. Wharton Jr,

Railroad Switch,

No. 1,143. Reissued Feb. 19, 1861.

Witnesses:
Henry Howden
Horace Lee

Inventor:
Wm Wharton Jr

N. PETERS, PHOTO-LITHOGRAPHER, WASHINGTON, D. C.

UNITED STATES PATENT OFFICE.

WILLIAM WHARTON, JR., OF PHILADELPHIA, PENNSYLVANIA.

IMPROVEMENT IN TRANSFERRING CARS FROM ONE TRACK TO ANOTHER.

Specification forming part of Letters Patent No. 30,100, dated September 18, 1860; Reissue No. 1,143, dated February 19, 1861.

*To all whom it may concern:*

Be it known that I, WILLIAM WHARTON, Jr., of the city of Philadelphia, State of Pennsylvania, have invented a new and useful Improvement in the Mode of Transferring Cars from one Track to Another; and I do hereby declare the following to be a full, clear, and exact description of the same, reference being had to the accompanying drawings, and to the letters of reference marked thereon.

My invention relates to an improvement in the mode of altering the course of railway-cars, for which Letters Patent were granted to William Brown, of Philadelphia, on the 30th day of August, 1859; and my improvement consists in the employment, in connection with sidings or turn-outs on railways, of a supplementary inclined or curved guide-rail in combination with car-wheels, so constructed as regards the said supplementary rail, which is so arranged in respect to the rails of the main track and those of the siding that the wheels may be transferred from the control of the rails of one track to that of the other by a lateral thrust caused by the wheels beating against the side only of the said inclined or curved guide-rail, as fully described hereinafter.

In order to enable others skilled in the art to make and use my invention, I will now proceed to describe its construction and operation.

Figure 1:
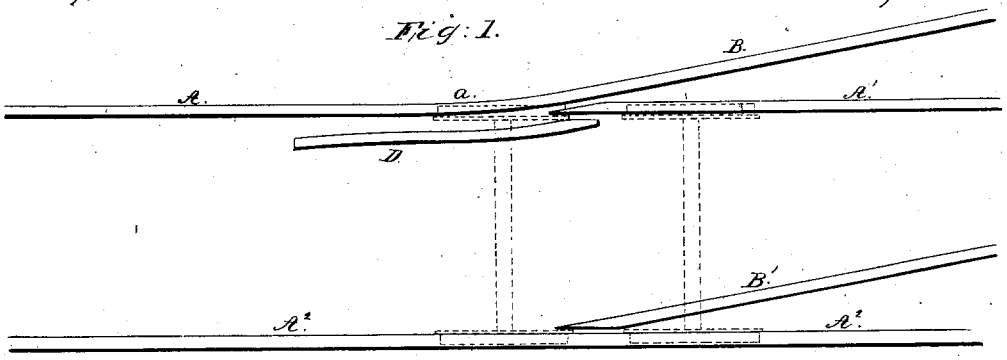
Figure 2:
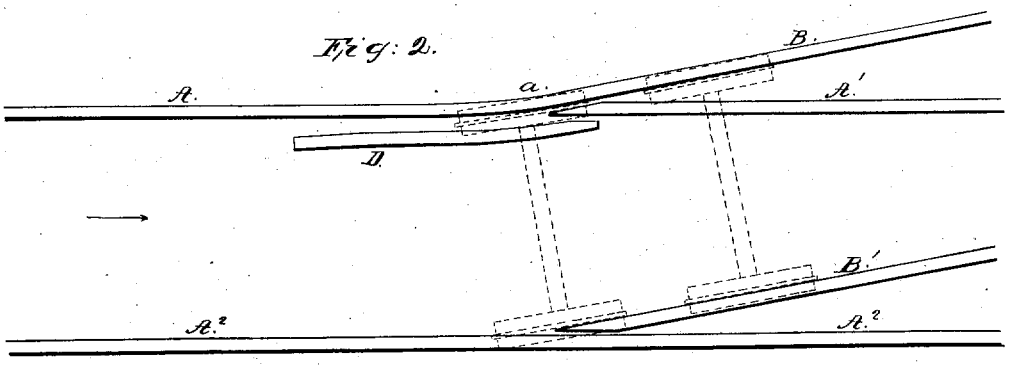
Figure 3:
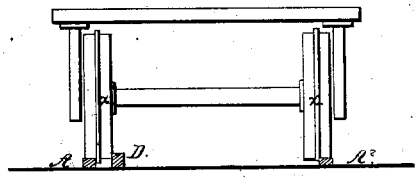

On reference to the accompanying drawings, which form a part of this specification, Figures 1 and 2 are ground plans of part of a railway and a turn-out illustrating my improved mode of transferring cars from one track to the other; Fig. 3, an end view of a truck with wheels so constructed as to pass from the main track to the turn-out.

A, A′, and $A^2$ represent the direct rails forming the main track, and B and B′ the rails of the siding or turn-out. The rail A joins the rail B with a gentle curve at *a*, Figs. 1 and 2, one rail being a continuation of the other. At this curved junction of the rails A and B the portion A′ of the rail of the main track is separated from the diagonal rail B of the turn-out by a space, *b*, sufficiently large to allow for the free passage of the flanges of the wheels. The rail B′ of the siding meets the rail A′ of the main track at a point opposite to that where the rail A′ meets the rail B, there being sufficient space between the rail B′ and the rail $A^2$ for the passage of the flanges of the wheels.

To the track and at a suitable distance from the rail A is secured a supplementary or guide rail, D, the end *e* of which is slightly curved or inclined to correspond with the inclined rail B of the siding, and projects a short distance beyond the end of the rail A′, the distance between the latter and the guide-rail being such as to allow the flanges of the wheels to pass freely between them. The guide-rail is also slightly inclined from about its middle toward the end *f*, so as to form a space gradually increasing in width between the said guide-rail and the rail A of the main track.

The cars which have to traverse the direct rails of the main track are provided with the usual wheels, (seen in red lines, Fig. 1,) the flanges of the wheels on one side passing between the supplementary guide rail D and the rail A′, and the flanges of the wheels on the opposite side passing freely between the rail B′ of the turn-out and the rail $A^2$ of the main track, as the guide-rail D is so situated that it in no way disturbs the tendency of these wheels to traverse the rails of the main track.

The cars which have to pass from the main track to the siding or turn-out are provided with wheels having simple annular projections *x* on the inside, as seen in Fig. 3, the projections being of such a width that in passing between the rail A and the supplementary rail D a lateral thrust will be imparted to the wheels which will be directed onto the rail B of the siding, as seen in Fig. 3, the wheels on the opposite side of the car taking the direction of the rails B′.

I am aware that a curved rail has been heretofore applied to turn-outs on railways for the purpose of changing the direction of the cars, and that such a rail has been described in the patent granted to William Brown, August 30, 1859, in which a grooved pulley or flange is used on the inside of the wheels for engaging into and riding over the curved bar—a plan objectionable on account of the expense incurred in casting the grooved pulley on the wheel and the liability of the flanges of the latter to break by the strain imparted to them when engaging into the curved bar.

I claim as my invention and desire to secure by Letters Patent—

The employment, in connection with sidings or turn-outs on railways, of a supplementary inclined or curved guide-rail, in combination with car-wheels so constructed as regards the said supplementary rail, which is so arranged in respect to the rails of the main track and those of the siding that the wheels may be transferred from the control of the rails of one track to that of the rails of the other by a lateral thrust caused by the wheels bearing against the side only of the said guide-rail, as set forth.

In testimony whereof I have signed my name to this specification before two subscribing witnesses.

WM. WHARTON, JR.

Witnesses:
HENRY HOWSON,
JOHN WHITE.